(12) United States Patent
Conceicao

(10) Patent No.: US 9,480,910 B2
(45) Date of Patent: Nov. 1, 2016

(54) INTERACTIVE EMBODIED ROBOT VIDEOGAME THROUGH THE USE OF SENSORS AND PHYSICAL OBJECTS

(71) Applicant: Marta Isabel Santos Paiva Ferraz Conceicao, Aroeira (PT)

(72) Inventor: Marta Isabel Santos Paiva Ferraz Conceicao, Aroeira (PT)

(*) Notice: Subject to any disclaimer, the term of this patent is extended or adjusted under 35 U.S.C. 154(b) by 232 days.

(21) Appl. No.: 14/357,317

(22) PCT Filed: Nov. 9, 2012

(86) PCT No.: PCT/PT2012/000044
§ 371 (c)(1),
(2) Date: May 9, 2014

(87) PCT Pub. No.: WO2013/070103
PCT Pub. Date: May 16, 2013

(65) Prior Publication Data
US 2014/0302931 A1 Oct. 9, 2014

(51) Int. Cl.
G11B 31/00 (2006.01)
A63F 13/20 (2014.01)
A63F 13/803 (2014.01)
A63H 17/00 (2006.01)

(52) U.S. Cl.
CPC ............. *A63F 13/20* (2014.09); *A63F 13/803* (2014.09); *A63F 2300/69* (2013.01); *A63H 17/00* (2013.01); *G05B 2219/40411* (2013.01)

(58) Field of Classification Search
CPC ... A61B 5/05; A61B 8/0883; A63F 2300/69; A63F 13/02; A63F 13/10; A63F 2300/1025; A63F 2300/1043; A63F 2300/1062; A63F 2300/1087; A63H 17/00; A63H 11/00; A63H 2200/00
See application file for complete search history.

(56) References Cited

U.S. PATENT DOCUMENTS

| | | | | |
|---|---|---|---|---|
| 6,459,955 B1* | 10/2002 | Bartsch | ...................... | A47L 9/00 318/568.11 |
| 2007/0097832 A1* | 5/2007 | Koivisto | ................... | A63F 3/08 369/63 |
| 2007/0192910 A1* | 8/2007 | Vu | ........................... | B25J 5/007 700/245 |
| 2010/0258362 A1* | 10/2010 | Trimmer | ................ | A63H 11/18 180/7.1 |
| 2010/0298976 A1* | 11/2010 | Sugihara | ................ | A63H 11/20 700/248 |

* cited by examiner

*Primary Examiner* — Justin Myhr
(74) *Attorney, Agent, or Firm* — Lucas & Mercanti, LLP

(57) ABSTRACT

The present invention refers to an embodied Robot videogame apparatus that receives input through the (human) user's physical actions (full body actions), contact and physiological signals (Bio-signals). The apparatus has principal components: led/sound sensor eye with a video camera; mechanical lever; rotation sensor; rubber torso; solar battery; sensor leds; heart rate and galvanic skin response sensor; multi-touch computer display, with a I/O board v2.0 Bluetooth wireless connection; multiplayer button; microphone; intensity sensor; feet support; suspensions; rubber pneumatic wheels; accelerometer sensor; plastic leveler sensor; wireless Bluetooth digitizers; Velcro strips; and GPS. The apparatus includes a series of electronic sensor that detects the user's input physical actions, contact and physiological signals in real-time. The output result is visualized on a multi-touch computer display. The player's real-time actions are translated in virtual actions in the software game scenarios (e.g., running with the physical robot represents the same virtual action in the game avatar). The apparatus establishes a simultaneous connection between physical and virtual realities and can be shared through online connection.

28 Claims, 4 Drawing Sheets

INTERACTIVE EMBODIED ROBOT VIDEOGAME THROUGH THE USE OF SENSORS AND PHYSICAL OBJECTS

TECHNICAL FIELD OF THE INVENTION

This invention relates to an interactive embodied robot videogame through the use of sensors and physical objects.

BACKGROUND OF THE INVENTION

The present invention falls within the area of videogames (Human-Computer Interaction), integrating robots for videogames, with Various input and output auxiliary machinery, for increased interactivity between the users and the videogame (biologic and biomechanic human enhancement).

The relevant documents to the current state of the art are, in particular, the patents no. US2006223637, US2009291764, US2007256541, JP2011147490 and JP2006181300.

SUMMARY OF THE INVENTION

The invention as well as an apparatus is a method of communication and interactivity.

The invention can be used in many places, namely in house, streets, playgrounds, schools and rehabilitation centers.

The invention integrates a self-sustainable system: solar energy is captured (by a solar battery) and converted into electric energy to power all the components of the system apparatus.

The present invention relates to a robot videogame with electronic wireless sensors and connection with physical objects, which operates through a computer.

The invention apparatus is used in mixed reality environments, virtual and physical realities, in combining virtual and physical spatial contexts at indoors and outdoors, allowing also for different physical (body-to-body interactions) and virtual (Virtual teleportation) geographical connections, in a virtual/physical collaborative platform between various robot videogame apparatus.

The users are the players who perform the interactive robot videogame, whereas the connection between the players and the invention is made through the use of electronic wireless sensors, other players and many physical objects.

1. The Robot Which the Videogame is Incorporate

The robot referred to in the present invention has a semi-human appearance, integrating a head, a stem and a support allowing its displacement on the physical space.

On the front of the robot head, in particular in the area of the eyes are located: a sound LED with a video camera and a mechanical lever. On the back of the head of the robot is located a rotation sensor.

The robot has a rubber torso in which is located on the front: a solar battery and LEDs sensors. On the back of the robot are located: the heart rate and galvanic skin response sensors; the multi-touch computer display; multiplayer button; microphone; and an intensity sensor.

The microphone detects and recognizes user's real-time verbal speech input and gives real-time verbal speech answer output (through the LED/sound eye), according to the initial user's input.

The robot has a triangular base with support for the user's feet, three suspensions, three rubber pneumatic wheels and an accelerometer sensor.

Between the rubber torso and the triangular base is located a plastic leveler sensor that allows the change of the height of the robot.

Wireless Bluetooth digitizers are coupled to the sensors: receive digital signals from the sensors and transmits them through digital message to the multi-touch computer display.

All of the components that characterize the invention are detachable, which give the users the possibility of transforming the appearance and interaction options with the apparatus. The assembly of the invention apparatus is modular making the system personalized to each user.

This modification operates through Velcro strips placed in the wireless electronically sensors and that can connect with the robot rubber torso. According to this advantage each player can build a different apparatus, with different appearances and functionalities.

2. Robot Videogame Performance

In real-time, the interactive videogame reacts to the input from the user's body physical actions, physiological signals and speech recognition, to obtain, in real-time output, in the virtual game avatar and the virtual scenarios.

The user plays a videogame by connecting with the robot video game apparatus through its embodied actions in different physical environments.

These actions aim to accomplish different tasks in the videogame software.

The input signals from the users physical actions with the robot video game apparatus are processed in the multi-touch computer display. These inputs are detected through the wireless electronic sensors. The output is visualized in the multi-touch computer display, besides produced sound (music and "speech") and lights.

A computer with a multi-touch display integrated in the robot apparatus manages the videogame software.

The invention apparatus is to be used in mixed reality environments, virtual and physical reality, combining virtual and physical spatial contexts (indoors and outdoors), allowing also for different geographical connections in a virtual/physical collaborative platform between various robot video game apparatuses.

The interactive videogame provides a connection in real-time with both realities: virtual and physical. Most of the developed scenarios aim to combine a symbolic intention from the virtual scenario, to be applied in the real physical environment where the user plays a video game narrative. The player can also program its video game narrative by building its own game.

The interactive videogame can be played by a single player or by multiple players. The users can interact collaboratively with the software by communicating (simultaneously) with the apparatus through their physical actions (and bio-signals). User's actions are connected with the wireless electronic sensors. Users can also play collaboratively in different spatial contexts (by sharing their physical and virtual performance).

One of the advantages of the interactive videogame is that enhances the playable area of video games, because it allows the game to be played indoors or outdoors (different physical contexts), connects to the user's bio-signals (enhanced human biologic data) and full body actions (enhanced human biomechanics data), and provides an off-line or online playable mode (provided that there is an online connection between players all over different geographical areas—same or different spatial physical areas).

Moreover, the users can share their videogame software experiences through video recording in real-time, sharing their physical and digital performances, to be visualized in the multi-touch computer display.

The player can control the level of intensity of the videogame interactions by controlling the wireless electronic sensors input intensity in the software video game.

Other of the advantages of this invention is that persuades the user to increase its physical activity levels and learning skills.

The system provides real-time information about the produced biomechanical and physiological data combined results, on an accurate measurement of the real-time state of the user's body (bio-signals): displacement on a spatial context; manipulations; heart rate data; and skin galvanic response data (emotional states); the system adapts the software response dynamically to motivate the user to undertake a course in the narrative to better suit its physical, physiological and psychological needs.

Furthermore, the users are persuaded to execute and learn different motor actions with their full bodies, and to understand and control their physiological data signals (what we defined as Bioception sensory modality), at the same time they are persuaded to learn about different theoretical fields (e.g. math, biology, chemistry, physics, anatomy, astronomy, science, ecology, among others).

The users play a videogame by performing different motor and physiological inputs, connected to plurality of provided wireless sensors. The invention has a plurality of detachable wireless sensors that can be connected in any part of the invention apparatus.

The wireless electronic sensors are connected to an I/O board wireless Bluetooth connection, which it's integrated in a multi-touch computer display as an internal interface board. This I/O board wirelessly captures and translates the wireless electronic sensors input signals with high resolution into digitally computer-encoded messages to the multi-touch computer display placed in the back of the invention apparatus.

All the input data from the electronic sensors is transmitted to a videogame software program inside the multi-touch computer display. The data is then processed by the software and converted into triggers that make the videogame react. The final result of the software process is then transmitted visually in the multi-touch computer display.

The user's physical actions input persuaded by the game tasks corresponds to common physical gestures—walking, running, pushing, pulling, rotating, trotting, skating, pressing, catapulting, catching, throwing, among all the possible user's bodies physical actions. The connection to the physical environments is achieved by persuasive action, e.g., the user is persuaded to interact with the physical environment by moving the apparatus on the physical space. This action is captured by the wireless electronic sensors and remotely transferred to the software program.

Other functionality of the videogame is allowing collaborative actions during the proposed software videogame tasks: users can share the video game by playing with the same invention apparatus system and its components (e.g., multiple users pushing the invention apparatus); collaborate by playing and sharing multiple software videogame tasks in the same geographical spatial area with different invention apparatuses (through GPS and WEB server); collaborate online through GPS/Web server in different geographical spatial areas using different videogame system apparatuses.

Another advantage is that one of the components is a video camera that allows recording the user physical videogame experiences to be shared on-line.

The user can also control the wireless electronic sensors input intensity through the video game software—changing the main characteristics of its role-play according with the pretended video game actions input.

Moreover, through the use of this invention users are persuaded to develop their cognitive, motor and social-affective competences by playing and creating their own video games narratives in mixed reality environments—physical and virtual. Also the persuaded physical activity goal its intended to achieve high physical activity levels exploring various forms of movement possibilities and increasing energy expenditure rates, which can result on preventing overweight and obesity pathologies, by promoting user's physical health.

Other advantage is the collective extended connection characteristic from the robot video game apparatus. Produced data is shared online (user's displacement on a spatial context; physical interactions; heart rate data; skin galvanic response data, etc.). These functions give to the invention the characteristics of being a worldwide contextual and embodied connection apparatus.

DETAILED DESCRIPTION OF THE INVENTION

Figure 1:
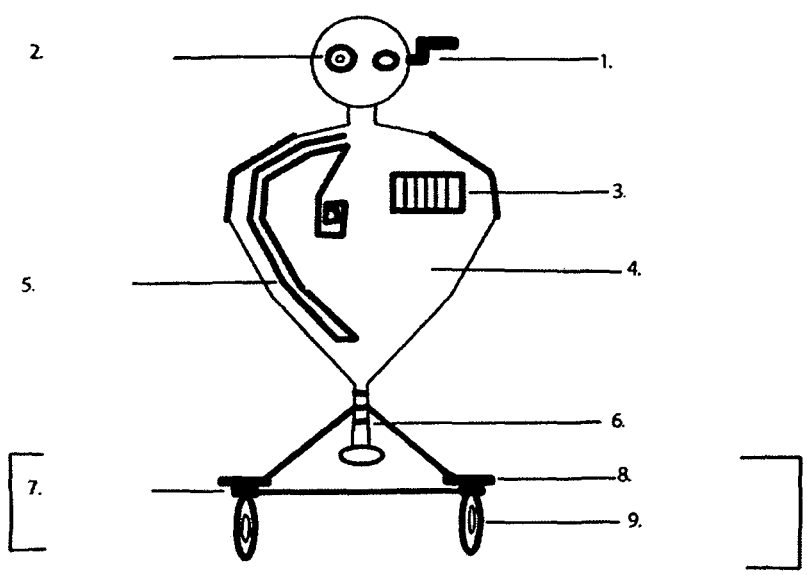
FIG. 1—is a draw of the front of the embodied robot system videogame apparatus invention with the representative head of the robot with a mechanical lever and a led and sound sensor eye with camera; the rubber torso with a solar battery and sensors leds; the plastic leveler sensor and the triangular base with three suspensions; and the three rubber pneumatic wheels and feet support.
Figure 2:
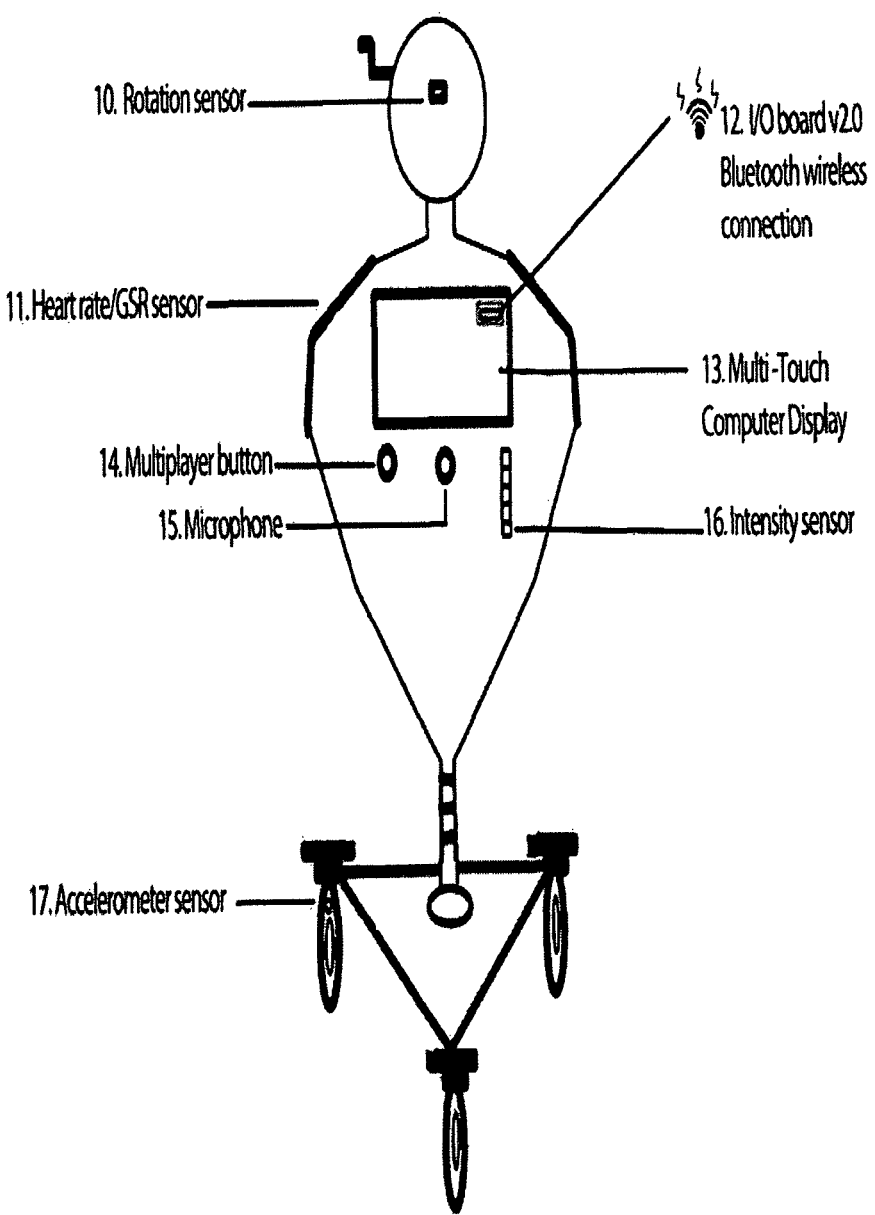
FIG. 2—is a draw of the back of the embodied robot system videogame apparatus invention with the representative head of the robot with a rotation sensor; rubber torso integrating heart rate and galvanic skin response sensors; rubber torso integrating a multi-touch computer display with an I/O board (v2.0 Bluetooth wireless connection), a multiplayer button, a microphone and an intensity sensor; an accelerometer sensor placed on the triangular base.
Figure 3:
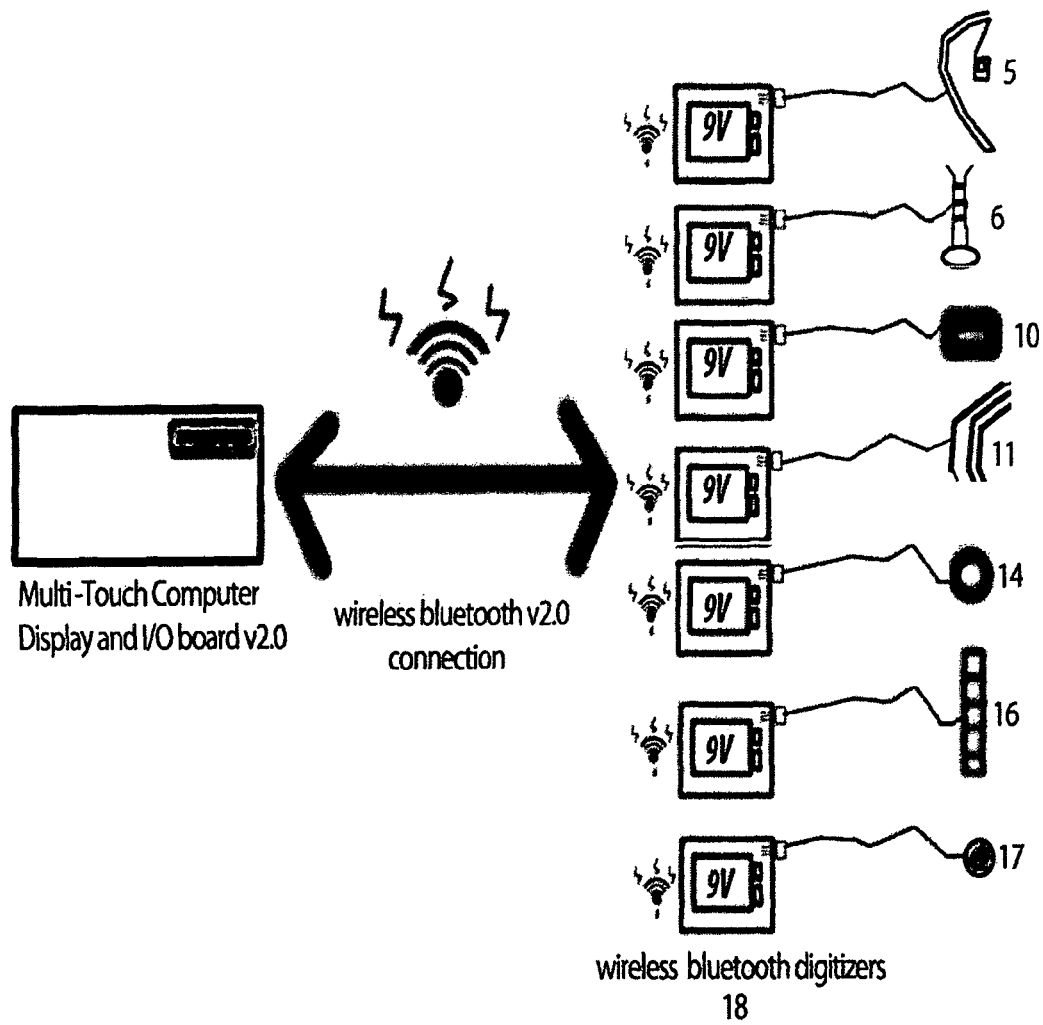
FIG. 3—is a draw of the multi-touch computer display with its integrated I/O board v2.0, connected via wireless Bluetooth 2.0 with the wireless Bluetooth digitizers from the electronic sensors.
Figure 4:
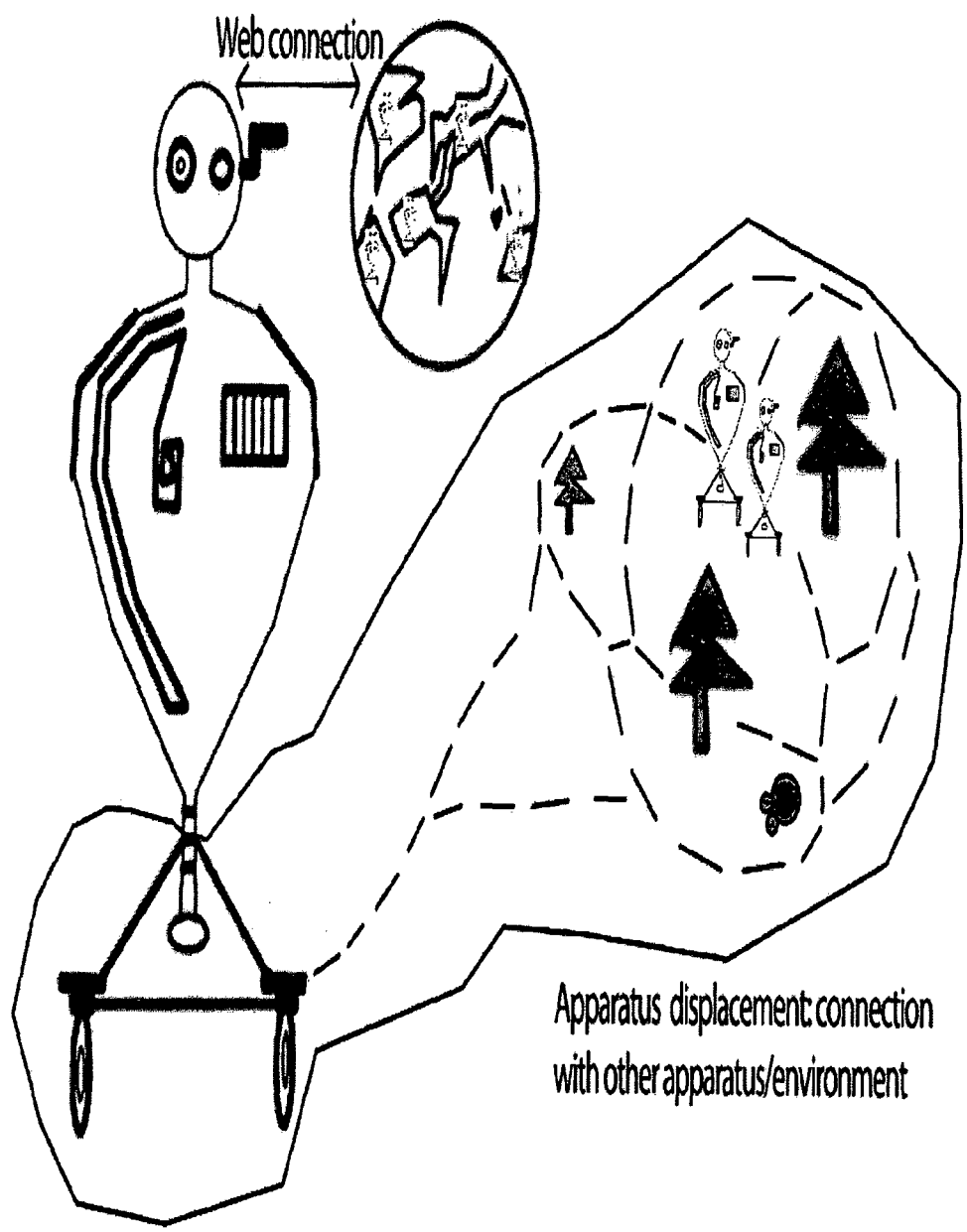
FIG. 4—is a draw of the embodied robot system videogame apparatus invention and its online connection, other embodied robot system videogame apparatuses, and the surrounding environment.

We will now make a detailed description of the invention, according with the previous presented figures.

The invention comprises the following components: the mechanical lever (1), the led/sound sensor eye (2) and a rotation sensor (10) on the head of the robot. The following components are placed on the rubber torso (4): the solar battery (3), the sensor leds (5), the heartrate and galvanic skin response sensor (11), the multi-touch computer display (13), with the I/O board v2.0 Bluetooth wireless connection (12), the multiplayer button (14), microphone (15) and the intensity sensor (16).

The rubber torso (4) is supported by a triangular base which is composed with three mechanical suspensions (7), three rubber pneumatic wheels (9), feet support (8), and the accelerometer sensor (17).

Between the rubber torso (4) and the triangular base it's located a plastic leveler sensor (6).

The drawings represent an Interactive embodied robot videogame apparatus integrating electronic wireless sensors and physical objects with components.

The mechanical lever (1) has to components: a light bulb placed on the left frontal and lateral part of the robot head (simulating an eye and with a physical lever); a dynamo motor generator that converts user's hand physical manipulations (circular movements) into electrical energy to power a 2V light bulb. The mechanical lever (1) has 12×1.5×1 cm and it's connected with the 16×6×6 cm light bulb that supports the lever. The mechanical lever (1) weights 0.2 Kg.

The led/sound sensor eye (2) it's placed in the right frontal part of the robot head (simulating an eye). It translates the audio software videogame's output in sound waves: robot's speech (audio language) and other produced sounds (e.g., music). The led/sound sensor eye (2) is connected to the multi-touch computer display (13) through a mini jack plug (0.35 cm) to acquire the videogame software output audio signal. Users can either switch the led/sound sensor eye (2) "On" and "Off" by a button and adjust volume by turning a plastic wheel. This led/sound sensor eye (2) is recharged by the multi-touch computer display (13) via USB 2.0 connection with a 5V supply. The led/sound sensor eye (2) also has a single 1080p HD camera that allows for 720p/1080p video capture with frame rates from 1 hz to 60 Hz. The led/sound sensor eye (2) has 2.5×2.5×2 cm and weights 0.07 Kg.

The rotation sensor (10) it's placed in the superior part of the embodied robot system videogame apparatus (back of the head). It calculates the apparatus position through the triple-axis earth's magnetic field: apparatus acceleration intensity, allowing for identifying the invention apparatus position in three physical dimensions on spatial coordinates (e.g. "up", "down", "left", "right", "rotations"). This sensor gives digital input to the multi-touch computer display (13) videogame software with a range of ±1 Gauss and heading accuracy of 2.0 deg RMS at 0 deg tilt, 3.0 deg RMS at ±15 deg tilt, 4.0° RMS at ±60 deg tilt. This sensor measures 2.8×2.1×1 cm and weights 0.3 Kg.

The solar battery (3) it's placed in the front left side of the rubber torso (4), and it includes a 16V 210 mA 2 W solar panel that gives 19V power supply to the multi-touch computer display (13)—gives constant charging through its fiberglass solar panels. The solar battery (3) recharges from 35 to 38 hours under strong direct sun light. It has 16×9×1.5 cm and weights'0.42 Kg.

The sensor leds (5) it's placed on the front right side of the embodied robot system videogame apparatus. It produces visible light while pressed and generates digital input to the multi-touch computer display (13), videogame software, according to the user's physical actions. The sensor leds (5) allows to identify the spatial areas where the pressure is made in the sensor leds (5)—identifies the pressure that the user produces (10 KPa-0.10 Kg/cm<2>, 1.5 PSI) to 981 KPa (10.0 Kg/cm<2>, 142 PSI), according to each 5 mm area. It has 150×0.2×0.1 cm and weights 0.02 Kg.

The rubber torso (4) is made of dense rubber and allows for the user to control the embodied robot system videogame apparatus with its body (e.g. "push" and "pull"). The rubber torso (4) sustains the different electronic and mechanical components from the embodied robot system videogame apparatus: the solar battery (3), the sensor leds (5), the rotation sensor (10), the heart rate and galvanic skin response sensor (11), the multi-touch computer display (13), the multiplayer button (14), the microphone (15), and the intensity sensor (16). The rubber torso (4) has 80×50×25 cm, weights 65 Kg (including all its mechanical and electronic components), and it is connected at its bottom with a plastic leveler with sensor (6).

The heart rate and galvanic skin response sensor (11) is placed on the upper sides (left and right sides) of the rubber torso (4) allowing measuring the user's heart rate (heart rate variability) and galvanic skin response (calculates the variations of user's emotional states) in real-time. Each one of these sensors has one rectangular surface sensor pad (20.3× 20.3×1.5 and weights 0.4 Kg) that is made of electrical conductive material to measure the skin temperature, heat flux and skin electrical conductivity. Data results from this sensor are visualized in the multi-touch computer display (13) videogame software.

The multiplayer button (14) is placed in the back left part of the rubber torso (4), and when pressed it starts the multiplayer function by activating the GPS function: it allows for the users to start a connection with other players by playing a collective game in the same (GPS connection) or different geographical location (a web server). The multiplayer button (14) measures the applied force by the user in a range of 0.1 cm, or 2.0 N (0.20 Kg) in real-time. It has 3×1.5×0.5 cm and it weighs 0.01 Kg.

The microphone (15) it's placed in the back central part of the rubber torso (4). It's an acoustic-to-electric transducer that converts sound waves into an electrical signal. The microphone (15) captures the produced user's sound waves ("speech") and converts them to a digital signal to be recognized by the videogame software. Once these specific sound waves are analyzed, the software produces a wave sound output response through the led/sound sensor eye (2) to interact with the user. The microphone (15) connects to the multi-touch computer display (11) via cable TRS connector (input to the soundcard).

The intensity sensor (16) is a slider bar placed in back right part of the rubber torso (4), to measure the user's contact position in a range of 10 cm (linear resistive potentiometer). The user is persuaded to use this sensor (by sliding a rubber button in two directions), to control the videogame software tasks. It has 2.4×1.1×1.1 cm and weights 0.02 Kg.

The plastic leveler with sensor (6) is a plastic cylindrical structure with six protrusions that fit internally with the rubber torso (4). The plastic leveler with sensor (6) allows for the user to set different height levels for the rubber torso (from 80 to 160 cm), with a fitting sensors sprockets modulator system. The user personalizes the rubber torso's (4) height by pulling or pushing it "side-up" or "side-down" with its hands, and by selecting each one of the 5 sprockets levels, integrating 5 sensors for each level: responding to a pressure from approx. 4 KPa (0.04 Kg/cm<2>, 0.6 ESI) to 981 KPa (10.0 Kg/cm<2>, 142 PSI) or a force of approx. 0.6 N (0.60 Kg) to 98 N (10 Kg) that's evenly applied across its active area, in a 13 mm diameter disk. The plastic leveler with sensor (6) activates a wireless communication between its single wireless Bluetooth digitizer and the I/O board v2.0 Bluetooth wireless connection (12) placed in the multi-touch computer display (13). The digital and mechanical input (five sensors and five sprockets modulator system) is translated in the videogame software scenarios. The plastic leveler sensor (6) has 50×23×18 cm and weights 2 Kg.

The plastic leveler sensor (6) it's connected to a triangular base made with steel that it's wrapped with dense rubber. It sustains the robot torso, has 41 cm on each side, and weights 2.1 Kg. The triangular base integrates a three sponge feet support (8) for the user to place its feet, hands, etc., (allowing for the user to manipulate the apparatus in various ways), and supporting the users weight up to 120 KG.

The three sponge feet supports (8) have 15×13×3 cm and weight 0.3 Kg. The three sponge feet supports (8) are screwed to the suspensions (7) through a steel base. One rubber suspension for each of the three sponge feet supports (8). Each of the suspensions (7) has a diameter of 10 cm and supports the three rubber pneumatic wheels (9) (connected with a steel screwed bilateral system to the wheels circumference center). The three rubber pneumatic wheels (9) enable the apparatus displacement in different contextual and physical terrains. Each of the three rubber pneumatic wheels (9) has a 20 cm diameter and weights 1.5 Kg.

The accelerometer sensor (17) it's placed in one of the rubber pneumatic wheels in the embodied robot system videogame apparatus, triangular base (9). The accelerometer sensor (17) measures the dynamic acceleration (or deceleration) and inclination (tilt, i.e. acceleration due to gravitation) in three dimensions simultaneously (X, Y, Z). At the same time it calculates the triple-axis earth's magnetic field (intensity and acceleration), allowing for the identification of the apparatus displacement characteristics in real-time. Data results are visualized and controlled in the videogame software in the multi-touch computer display (13), for e.g., activating the avatar displacement in the videogame software in real-time by "pushing" and "pulling" the embodied robot system videogame apparatus. It has 5.3×3.3×1.1 cm and it weighs 0.02 Kg.

A Bluetooth wireless connection with the I/O board v2.0 (12) integrated in the multi-touch computer display (13) is established with the apparatus sensors connected with wireless Bluetooth digitizers (18). A single Bluetooth digitizer connects to each wireless electronic sensor: the rotation sensor (10), the sensor leds (5), the plastic leveler with sensor (6), the heart rate and galvanic skin response sensor (11), the multiplayer button (14), the intensity sensor (16) and the accelerometer sensor (17). All of these wireless sensors are detachable what gives the users the possibility of transforming the embodied robot system videogame apparatus appearance and interaction options. The assembly of the invention apparatus is modular, making the system personalized to each user. These sensors can be connected to the rubber torso (4), and to external environment to the apparatus, via Velcro strips.

The wireless Bluetooth digitizers (18) have a micro plastic box format. They perform a signal acquisition to a maximum of 100 meters distance and transmit digital messages to the multi-touch computer display (13) in real-time. Each one of the wireless Bluetooth digitizers (18) its coupled/attached to the sensors via an internal connection with a 3-pin column input cable extremity (2.54 mm/0.1" spaced), which is then connected to an I<2>C port placed inside the wireless Bluetooth digitizers (18). The wireless Bluetooth digitizers (18) are empowered by a 9V battery (each one has 5×2.7×1.4 cm and weights 0.03 Kg).

The multi-touch computer display (13) is placed on the back central part of the embodied robot system videogame apparatus. The multi-touch computer display (13) is prepared for anti-shock and anti-vibration with a MIL810F system (shock Mounted Hard Drive). It has a sunlight readable display and it is prepared for dust, waterproof and high and low temperatures resistance (40° C. to −50° C.). It has a 7" widescreen 1024×600 resolution/TFT LCD. Its dimensions are 17×14×5 cm, with a weight of 1.1 Kg, with an ultra low power atom 2530 1.6 GHz processor (w/US15 W Chipset), 2 GB DDR2 RAM, a data Storage/Disk of 64 GB SSD solid state hard drive, and GPS included. The multi-touch computer display (13) includes the I/O board v2.0 (12) that establishes the v2.0 Bluetooth connection with the sensors (Bluetooth digitizers) wirelessly, with a 10 bits resolution (1024 steps of each 4.9 mV) that can sample at up to 5760 Hz milliseconds latency in real-time.

The apparatus invention is prepared for harsh environments—dust and waterproof and high/low temperatures resistance (40° C. to −50° C.).

The invention claimed is:

1. A robot apparatus comprising:
   a rubber torso;
   a triangular base adapted to support the rubber torso, the triangular base being made of steel, the triangular base further comprising three sponge feet supports connected to three suspensions, wherein the three suspensions are connected to three rubber pneumatic wheels that enable displacement of the robot apparatus in various physical terrains;
   a head disposed on the rubber torso;
   a multi-touch computer display disposed on a back side of the rubber torso;
   video game software displayed on the multi-touch computer display;
   a plurality of sensors connected to the rubber torso via a plurality of Velcro strips, the plurality of sensors including:
      a sensor leds disposed on a frontal right side of the rubber torso and adapted to produce visible light and generate input to the video game software in real-time when pressed by a user;
      a rotation sensor disposed on a back of the head, the rotation sensor adapted to calculate intensity and acceleration displacement of the robot apparatus based on a triple-axis magnetic field of the earth by identifying a position of the robot apparatus in physical space in real-time, wherein position information is represented in visual form by the videogame software operating on the multi-touch computer display;
      a heart rate and galvanic skin response sensor disposed on upper left and right sides of the rubber torso, the heart rate and galvanic skin response sensor adapted to measure a heart rate and galvanic skin response of a user in real-time, wherein measurements generated by the heart rate and galvanic skin response sensor are represented in visual form by the video game software on the multi-touch computer display;
      a multiplayer button disposed a back left side of the rubber torso, wherein the multiplayer button, when pressed by a user, activates a multiplayer function in the videogame software displayed on the multi-touch computer display;
      a microphone disposed on a back central part of the rubber torso, the microphone adapted to convert, in real time, speech and sound waves into digital signals recognized by the video game software in the multi-touch computer display; and
      an intensity sensor comprising a slider bar with a button disposed in a back right part of the rubber torso, the intensity sensor adapted to control, in real time, tasks associated with the videogame software displayed on the multi-touch computer display, in response to pressure applied by a user;
   the robot apparatus further comprising:
      a plastic leveler sensor comprising a cylindrical structure with six protrusions that fit internally inside the rubber torso allowing a user to select one of a plurality of height levels for the rubber torso;

an accelerometer sensor disposed in a selected one of the three rubber pneumatic wheels, the accelerometer sensor being adapted to generate a measurement, in real time, of one of a dynamic acceleration, a deceleration and an inclination of the robot apparatus in a physical terrain, wherein the measurement is translated into digital input to the video game software and is represented in visual form on the multi-touch computer display;

a plurality of wireless Bluetooth digitizers;

a solar battery that includes a solar panel disposed on a left part of the rubber torso, the solar battery being adapted to provide power to the multi-touch computer display via solar power;

a mechanical lever disposed on a left frontal and lateral part of the head, the mechanical lever adapted to convert physical movements of a user into electric energy to power a 2V light bulb; and a led/sound sensor eye disposed in a right frontal part of the head, the led/sound sensor adapted to translate audio output received from the videogame software operating in the multi-touch computer display into sound waves, speech and music, wherein the led/sound sensor eye includes a video camera adapted to capture images of activities performed by a user;

wherein the multi-touch computer display includes an I/O board v2.0 Bluetooth wireless connection adapted to communicate with the sensor leds, the rotation sensor, the heart rate and galvanic skin response sensor, the multiplayer button, the intensity sensor, the plastic leveler sensor, and the accelerometer sensor via the plurality of wireless Bluetooth digitizers;

wherein users can play the videogame in a same geographical location via GPS or in a different spatial location via a webserver; and wherein the computer display is connected to the triangular base made of steel.

2. The robot apparatus according to claim 1, wherein the mechanical lever comprises a light bulb, a dynamo motor generator and a lever.

3. The robot apparatus according to claim 1, wherein the led/sound sensor eye comprises a video camera and a mechanism adapted to translate an output of a videogame software into sound waves, and is connected to the multi-touch computer display via a cable to acquire the output signal from the videogame software.

4. The robot apparatus according to claim 3, wherein the led/sound sensor eye is rechargeable through the multi-touch computer display via a USB connection.

5. The robot apparatus according to claim 1, wherein the rotation sensor is connected to a respective one of the plurality of wireless Bluetooth digitizers, wherein the rotation sensor calculates an apparatus intensity and an acceleration displacement through a triple-axis magnetic field of an earth and identifies an apparatus position in physical spatial coordinates in real-time.

6. The robot apparatus according to claim 1, wherein the solar battery is adapted to obtain energy from sunlight and recharge the multi-touch computer display.

7. The robot apparatus according to claim 1, the sensor leds includes a respective one of the plurality of wireless Bluetooth digitizers, wherein the sensor leds produces a visible light while pressed.

8. The robot apparatus according to claim 1, wherein the rubber torso includes the solar battery, the sensor leds, the rotation sensor, the heart rate and galvanic skin response sensor, the multi-touch computer display, the multiplayer button, the microphone, and the intensity sensor;

wherein the solar battery, the sensor leds, the rotation sensor, the heart rate and galvanic skin response sensor, the multi-touch computer display, the multiplayer button, the microphone, and the intensity sensor are connected to the rubber torso by the plurality of Velcro strips.

9. The robot apparatus according to claim 1, wherein the rubber torso that is connected to a triangular base via the plastic leveler sensor.

10. The robot apparatus according to claim 1, wherein the heart rate and galvanic skin response sensor includes a respective one of the plurality of wireless Bluetooth digitizers and a rectangular pad made of an electrical conductive material, wherein the heart rate and galvanic skin response sensor measures skin temperature, heat flux and skin electrical conductivity, by measuring a heart rate of a user and a galvanic skin response of the user in real-time.

11. The robot apparatus according to claim 1, wherein the multiplayer button includes a respective one of the plurality of wireless Bluetooth digitizers, wherein the multiplayer button is disposed in the rubber torso, wherein the multiplayer button starts a multiplayer function by activating an online connection when pressed.

12. The robot apparatus according to claim 1, the microphone is disposed in the rubber torso, wherein the microphone includes an acoustic-to-electric transducer that converts sound waves into an electrical signal.

13. The robot apparatus according to claim 1, wherein the microphone is connected to the multi-touch computer display via a cable TRS connector input to a soundcard.

14. The robot apparatus according to claim 1, wherein the intensity sensor further includes a respective one of the plurality of wireless Bluetooth digitizers.

15. The robot apparatus according to claim 1, wherein the plastic leveler sensor includes a respective one of the plurality of wireless Bluetooth digitizers and a plastic cylindrical structure that has six protrusions that fit internally with the rubber torso.

16. The robot apparatus according to claim 1, wherein the plastic leveler sensor is activated by an action of pulling or pushing to select five sprockets levels, wherein each level integrates five sensors wherein the plastic leveler sensor responds to one of a pressure between approximately 0.6 PSI and 142 PSI and a force between approximately 0.6 N and 98 N.

17. The robot apparatus according to claim 1, wherein the plastic leveler sensor is connected to a triangular base that supports the rubber torso, wherein the rubber torso is made of steel and wrapped with a dense rubber.

18. The robot apparatus according to claim 17, wherein the triangular base with three feet supports support users having a weight up to 120 kg.

19. The robot apparatus according to claim 1, wherein the three feet supports are screwed to the rubber suspension via a steel base.

20. The robot apparatus according to claim 1, wherein each suspension supports a respective one of the three rubber pneumatic wheels, the suspension being connected with a steel screwed bilateral system to a center of the respective rubber pneumatic wheel.

21. The robot apparatus according to claim 1, wherein the accelerometer sensor includes a respective one of the wireless Bluetooth digitizers, wherein the accelerometer sensor is disposed in one of the three rubber pneumatic wheels, wherein the three rubber pneumatic wheels are the triangular base.

22. The robot apparatus according to claim 1, wherein the wireless Bluetooth digitizers comprise a micro plastic box and are adapted to acquire a signal from a distance of 100 meters and to transmit digital messages to the multi-touch computer display in real-time.

23. The robot apparatus according to claim 1, wherein the plurality of wireless Bluetooth digitizers are coupled to one or more wireless electronic sensors via an internal connection with a 3-pin column input cable extremity, the internal connection being connected to an I2C port placed inside the plurality of wireless Bluetooth digitizers.

24. The robot apparatus according to claim 1, wherein the wireless Bluetooth digitizer are recharged by a 9V battery.

25. The robot apparatus according to claim 1, wherein the multi-touch computer display includes an anti-shock and anti-vibration system, GPS capability, and a I/O board v2.0 Bluetooth wireless connection.

26. The robot apparatus according to claim 1, wherein the I/O board v2.0 Bluetooth wireless connection establishes a connection with one or more sensors wirelessly, with a 10 bits resolution, 1020 steps of each 4.9 mV, that can sample up to 5760 Hz milliseconds latency in real-time.

27. The robot apparatus of claim 1, wherein the robot apparatus is operated by a method comprising:
obtaining data relating to physical actions, physiological signals and speech via the rotation sensor, sensor leds, plastic leveler sensor, heart rate and galvanic skin response sensor, multiplayer button, intensity sensor and accelerometer sensor;
transmitting the data to the I/O board v2.0 Bluetooth wireless connection located in the multi-touch computer display;
receiving the data, by the I/O board v2.0 Bluetooth wireless connection;
translating, by the I/O board v2.0 Bluetooth wireless connection, the data into digitally computer-encoded messages;
transmitting the digitally computer-encoded messages to the multi-touch computer display;
providing the computer-encoded messages representing data obtained by the rotation sensor, sensor leds, plastic leveler sensor, heart rate and galvanic skin response sensor, multiplayer button, intensity sensor and accelerometer sensor as input to the videogame;
translating the digitally computer-encoded messages in-real time into a digital output including sounds and images;
providing the sounds and images via the multi-touch computer display in connection with the videogame;
recording results of the videogame in real time, by the video camera; and
sharing the videogame in real-time via an online connection.

28. The robot apparatus of claim 1, wherein a wireless communication is activated between the respective one of the plurality of wireless Bluetooth digitizers that is connected to the plastic leveler sensor and the I/O board v2.0 Bluetooth wireless connection integrated in the multi-touch computer display.

* * * * *